(12) United States Patent
Littlefield et al.

(10) Patent No.: US 10,500,938 B2
(45) Date of Patent: Dec. 10, 2019

(54) MOTOR VEHICLE POWERTRAIN

(71) Applicant: GM Global Technology Operations LLC, Detroit, MI (US)

(72) Inventors: Joseph R. Littlefield, Sterling Heights, MI (US); Alan G. Holmes, Clarkston, MI (US); Rebecca K. Risko Cattell, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 15/811,735

(22) Filed: Nov. 14, 2017

(65) Prior Publication Data

US 2019/0143801 A1   May 16, 2019

(51) Int. Cl.
*F16H 3/66* (2006.01)
*B60K 6/365* (2007.10)
*F16H 3/72* (2006.01)
*B60K 6/48* (2007.10)

(52) U.S. Cl.
CPC .......... *B60K 6/365* (2013.01); *B60K 6/48* (2013.01); *F16H 3/66* (2013.01); *F16H 3/724* (2013.01); *B60K 2006/4816* (2013.01); *B60Y 2200/92* (2013.01); *F16H 2200/2007* (2013.01); *F16H 2200/2035* (2013.01); *F16H 2200/2038* (2013.01); *F16H 2200/2041* (2013.01); *Y10S 903/911* (2013.01)

(58) Field of Classification Search
CPC .. B60K 6/365; B60K 6/48; F16H 3/66; F16H 3/724; Y10S 903/911
See application file for complete search history.

(56) References Cited

U.S. PATENT DOCUMENTS

| | | | | |
|---|---|---|---|---|
| 7,645,205 B2* | 1/2010 | Holmes | ................... | F16H 3/728 475/5 |
| 8,075,435 B2* | 12/2011 | Si | .......................... | B60W 20/15 475/5 |
| 2007/0021257 A1* | 1/2007 | Klemen | ................. | B60W 20/11 475/5 |
| 2008/0103002 A1* | 5/2008 | Holmes | ................. | B60K 6/365 475/5 |
| 2010/0137091 A1* | 6/2010 | Park | ....................... | B60K 6/365 475/5 |

(Continued)

*Primary Examiner* — Patrick H Mackey
(74) *Attorney, Agent, or Firm* — Quinn IP Law

(57) ABSTRACT

A vehicle powertrain includes first and second power sources and a transmission assembly having first and second input members and an output member. The transmission assembly also includes a first planetary gear-set connected to the first input member and a second planetary gear-set connected to the second input and the output members. The transmission assembly additionally includes a transmission housing retaining the first and second gear-sets. Furthermore, the transmission assembly includes a first torque-transmitting device for connecting one first gear-set node to the housing and a second torque-transmitting device for connecting a first gear-set node not connected to the housing to one second gear-set node. One first gear-set node is directly and continuously connected to one second gear-set node. The first power source is operatively connected to a node of the first gear-set and the second power source is operatively connected to a node of the second gear-set.

18 Claims, 4 Drawing Sheets

(56) References Cited

U.S. PATENT DOCUMENTS

| | | | |
|---|---|---|---|
| 2013/0331216 A1* | 12/2013 | Tuckfield | B60K 6/383 |
| | | | 475/5 |
| 2014/0296013 A1* | 10/2014 | Hata | B60K 6/365 |
| | | | 475/5 |
| 2015/0292600 A1* | 10/2015 | Ai | B60L 58/21 |
| | | | 475/5 |
| 2017/0136870 A1* | 5/2017 | Littlefield | B60K 6/365 |
| 2017/0320480 A1* | 11/2017 | Ye | B60K 6/365 |
| 2018/0141429 A1* | 5/2018 | Cho | F16H 3/728 |

* cited by examiner

MOTOR VEHICLE POWERTRAIN

INTRODUCTION

The disclosure relates to electric and hybrid-electric powertrains for a motor vehicle.

Modern motor vehicles are typically configured as either two- or all-wheel-drive. Either type of a vehicle may employ a powertrain with a single power source, such as an internal combustion engine or an electric motor, used to propel the vehicle, or a hybrid powertrain, where two or more distinct power sources, such as an internal combustion engine and an electric motor, are used to accomplish the same task. Vehicle drive wheels may receive power from each such combination of power sources. As such, a representative powertrain may be used to power a two-wheel-drive or an all-wheel-drive vehicle.

An all-wheel-drive vehicle using a hybrid powertrain may be configured as an axle-split vehicle. In such an all-wheel-drive hybrid vehicle, one or more power sources, such as an internal combustion engine alone or with an electric motor, on one axle, and another power source on another axle, may be set up to independently power the respective vehicle axles to generate on-demand all-wheel-drive propulsion. In such a vehicle, an engine with an electric motor connected to the same axle may be configured to channel their respective torque outputs through a transmission assembly to effectively provide a power-split electro-mechanical hybrid powertrain.

SUMMARY

A powertrain for a motor vehicle includes a first power source configured to generate a first torque output, a second power source configured to generate a second torque output, and a transmission assembly. The transmission assembly includes a first input member, a second input member, and an output member. The transmission assembly also includes a first planetary gear-set having a plurality of nodes and operatively connected to the first input member and a second planetary gear-set having plurality of nodes and operatively connected to the second input member and to the output member. The transmission assembly additionally includes a transmission housing configured to retain the first and second planetary gear-sets. Furthermore, the transmission assembly includes a first torque-transmitting device configured to selectively connect or ground one node of the first planetary gear-set to the transmission housing and a second torque-transmitting device configured to selectively connect a node of the first planetary gear-set not connected to the housing to one node of the second planetary gear-set. One of the plurality of nodes of the first planetary gear-set is directly and continuously connected to one of the plurality of nodes of the second planetary gear-set. Additionally, the first power source is operatively connected via the first input member to one of the plurality of nodes of the first planetary gear-set, and the second power source is operatively connected via the second input member to one of the plurality of nodes of the second planetary gear-set.

The second torque-transmitting device may be configured to selectively connect the node of the first planetary gear-set connected to the first power source to the node of the second planetary gear-set connected to the second power source.

The node of the first planetary gear-set connected to the first power source may be a sun gear member of the first planetary gear-set and the node of the second planetary gear-set connected to the second power source may be a sun gear member of the second planetary gear-set.

The first torque-transmitting device may be configured to selectively connect to the transmission housing a node of the first planetary gear-set not connected to the second planetary gear-set.

The node of the first planetary gear-set not connected to the second planetary gear-set may be a ring gear member of the first planetary gear-set.

The transmission assembly may additionally include a third torque-transmitting device configured to selectively connect to the transmission housing the node of the second planetary gear-set connected to the second power source.

The transmission assembly may additionally include a fourth torque-transmitting device configured to selectively connect the node of the first planetary gear-set connected to the first power source to the node of the first planetary gear-set directly and continuously connected to the one of the plurality of nodes of the second planetary gear-set.

The node of the first planetary gear-set directly and continuously connected to the one of the plurality of nodes of the second planetary gear-set may be a carrier member of the first planetary gear-set.

The vehicle may include a final drive assembly operatively connected to the second planetary gear-set at a node not directly and continuously connected to the first planetary gear-set.

The motor vehicle may be arranged along a longitudinal vehicle axis. In such an embodiment, each of the first power source, second power source, and the final drive assembly may be arranged along the longitudinal vehicle axis or along respective axes arranged transverse to the longitudinal vehicle axis.

The first power source may be an electric motor-generator, while the second power source may be an internal combustion engine.

A motor vehicle employing such a powertrain operatively connected via a final drive assembly to first and second road wheels is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
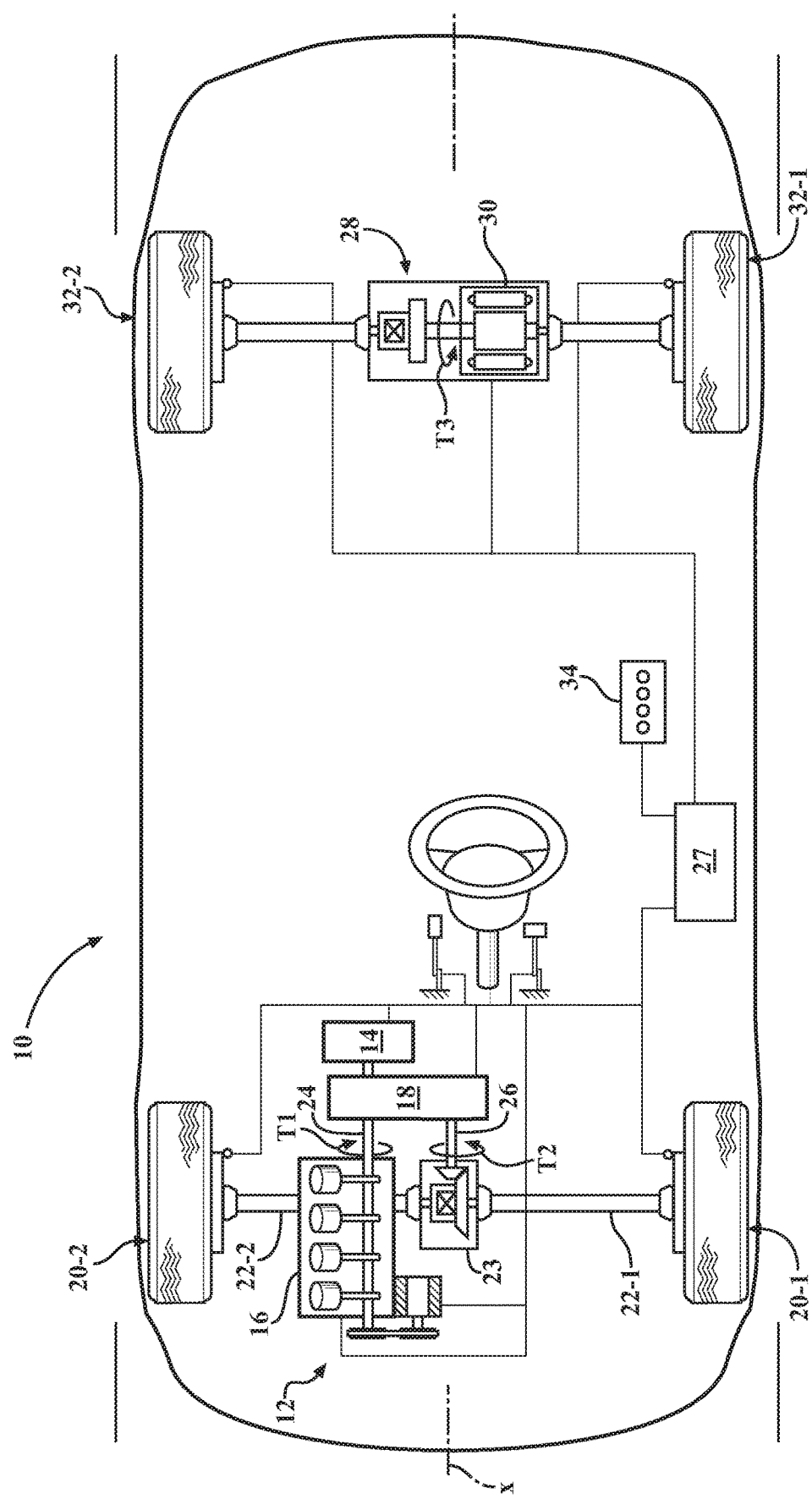
FIG. 1 is a schematic illustration of a vehicle employing a longitudinally oriented hybrid electric powertrain that includes a powertrain including two independent power sources coupled to a transmission assembly, according to the disclosure.

Referring to the drawings in which like elements are identified with identical numerals throughout, FIG. 1 illustrates a vehicle 10 having independent first and second power sources that may be operatively connected to respective sets of driven wheels in order to provide on-demand all-wheel-drive propulsion. The vehicle 10 may include, but not be limited to, a commercial vehicle, industrial vehicle, passenger vehicle, aircraft, watercraft, train or the like. As shown, the vehicle 10 is generally arranged along a longitudinal vehicle axis X. The vehicle 10 includes a first drive axle 12, which may be one of a plurality of drive axles employed in the vehicle. The drive axle 12 includes a powertrain 13. The powertrain 13 includes a first power source 14, which may be an electric motor-generator, as shown. The powertrain 13 additionally includes a second power source 16, which may be an internal combustion engine, as shown, and thus be configured as a power-split hybrid-electric drive axle.

In the powertrain 13 with the first and second power sources 14, 16 configured as the respective first electric motor-generator and the internal combustion engine, the drive axle 12 is configured as a power-split hybrid-electric drive axle, and the powertrain 13 is a hybrid powertrain. The drive axle 12 also includes a transmission assembly 18, along with a first set of wheels, including a first or left-side road wheel 20-1 operatively connected to transmission assembly via a first axle-shaft 22-1 and a second or right-side road wheel 20-2 operatively connected to the transmission assembly via a second axle-shaft 22-2. The drive axle 12 also includes a final drive assembly 23 operatively connected to and configured to distribute torque transmitted by the transmission assembly 18 to each of the first and second road wheels 20-1, 20-2. Each of the first power source 14, second power source 16, and the final drive assembly 23 may be arranged along the longitudinal vehicle axis X (shown in FIG. 1) or along respective axes Y1, Y2, and Y3 (shown in FIG. 2) arranged transverse to the longitudinal vehicle axis X.

In the embodiment of the powertrain 13 employing solely the first power source 14, the first power source is configured to drive the vehicle 10 through the transmission assembly 18, via the final drive assembly 23 and the first and second wheels 20-1, 20-2. Accordingly, such a single power source powertrain 13 is configured as part of a purely electric drive axle 12. In the power-split hybrid-electric embodiment of the drive axle 12, the first power source 14 and the second power source 16 are configured to drive the vehicle 10 through the transmission assembly 18, either together or separately, via the final drive assembly 23 and the first and second wheels 20-1, 20-2.

Specifically, the first power source 14 is configured to generate a first torque output T1, while the second power source 16 is configured to generate a second torque output T2, each for driving the vehicle through the transmission assembly 18. The transmission assembly 18 generally includes a first transmission input member 24-1 configured to receive torque of the first power source 14 and a second transmission input member 24-2 configured to receive torque of the second power source 16. The transmission assembly 18 also includes a transmission output member 26 configured to transmit torque from the transmission assembly to the first and second axle-shafts 22-1, 22-2 via a final drive assembly 23. The torque-transmitting devices include a first torque-transmitting device 42-1 and a second torque-transmitting device 42-2, as described in detail below. Additionally, the torque-transmitting devices may include third and fourth torque-transmitting devices 42-3, 42-4, as is also described below.

Figure 2:
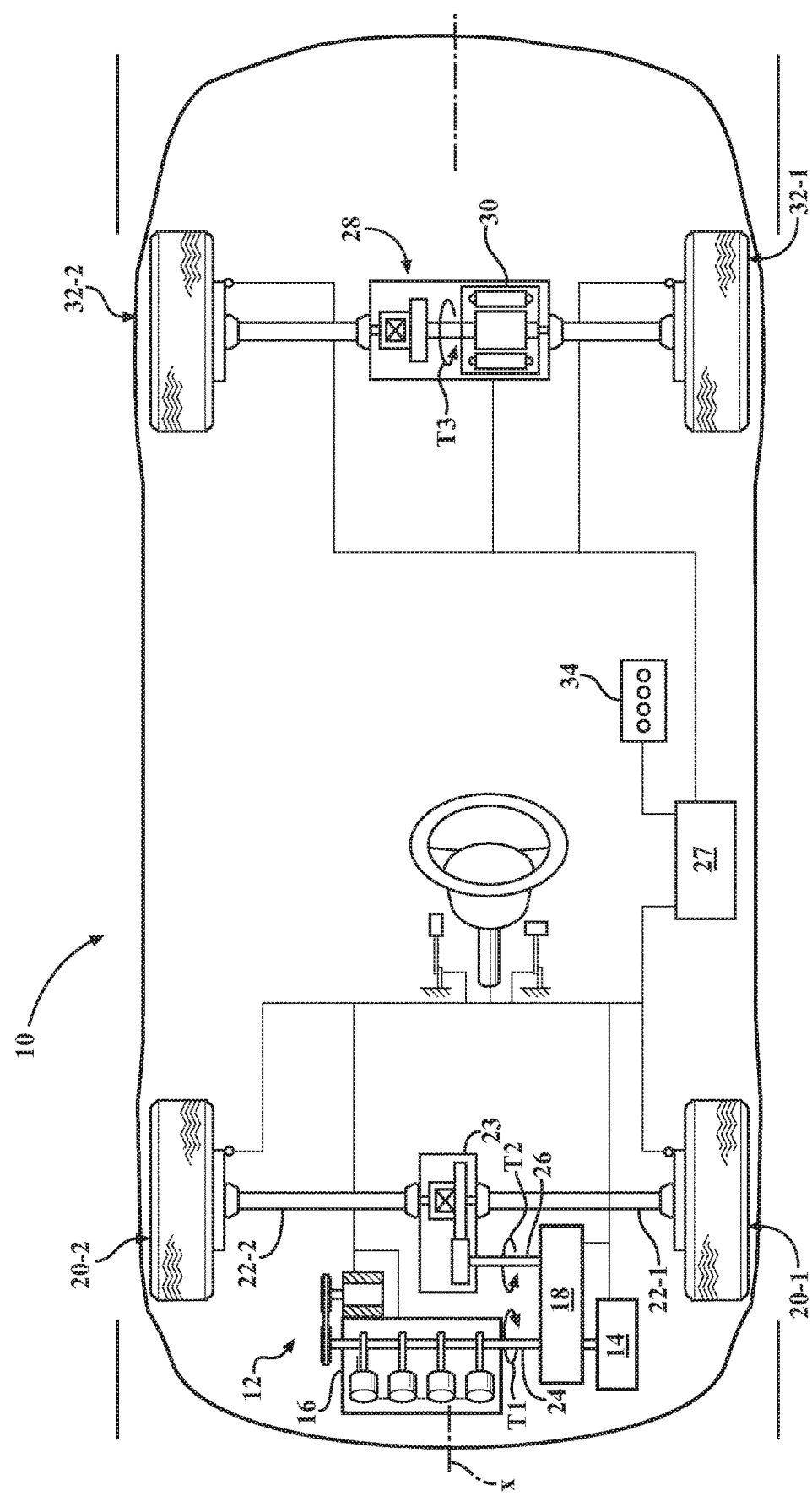
FIG. 2 is a schematic illustration of a vehicle employing a transversely oriented hybrid electric powertrain that includes a powertrain including two independent power sources coupled to a transmission assembly, according to the disclosure.

As shown in FIGS. 1 and 2, the vehicle 10 additionally includes a second drive axle 28. The second drive axle 28 is operatively independent from the first drive axle 12. The second drive axle 28 includes a third power source 30, shown as a first electric motor-generator that is configured to generate a third torque output T3 for driving the vehicle 10 via a second set of wheels, which includes a first or left-side road wheel 32-1 and a second or right-side road wheel 32-2. When configured as respective electric motor-generators, each of the first, second, and third power sources 14, 16, 30 receives its electrical energy from an energy storage device 34. Accordingly, the vehicle 10 may be powered by the respective first and second vehicle drive axles 12 and 28 independently or in combination to generate on-demand front, rear, or all-wheel-drive propulsion. Additionally, the first and second drive axles 12, 28 may be arranged such that the first drive axle is positioned at the front of the vehicle 10 and the second drive axle is positioned at the rear of the vehicle, or vice versa.

Figure 3:
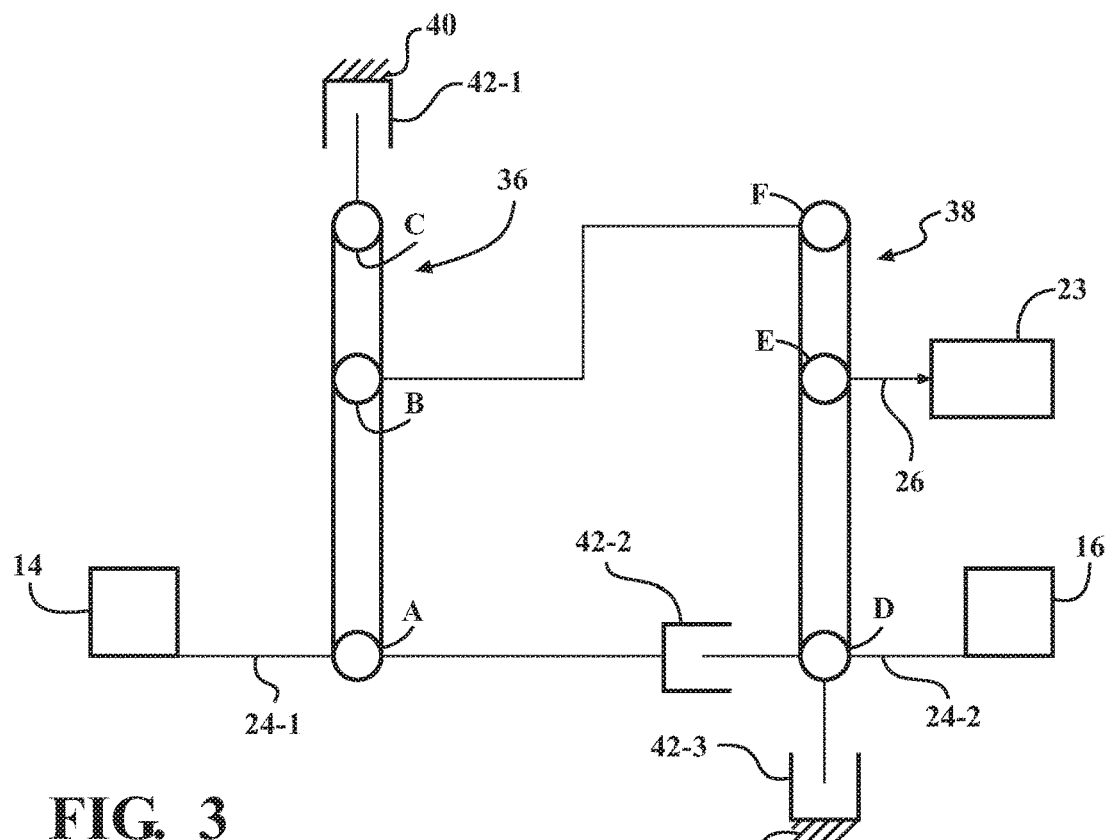
FIG. 3 is a schematic lever diagram illustration of one embodiment of the powertrain shown in FIG. 1 or FIG. 2.
Figure 4:
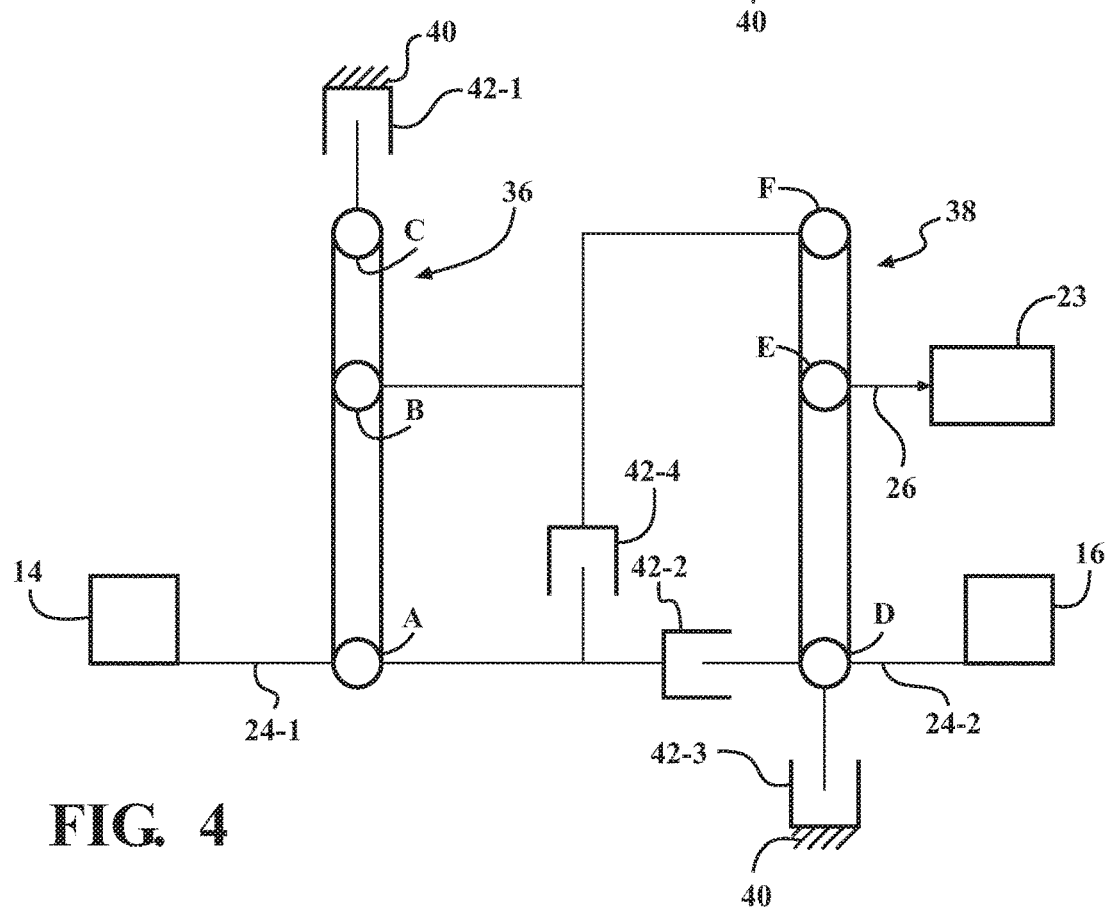
FIG. 4 is a schematic lever diagram illustration of another embodiment of the powertrain shown in FIG. 1 or FIG. 2.

Specific embodiments of the first drive axle 12 with the powertrain 13 using the transmission assembly 18 are represented in lever diagram form in FIGS. 3 and 4. A lever diagram is a schematic representation of the components of a mechanical device such as an automatic transmission. Each individual lever represents a planetary gear-set or an external gear-set. In the planetary gear-set levers, the three basic mechanical components of the planetary gear are each represented by a node. Therefore, a single planetary gear-set lever contains three nodes: one for the sun gear member, one for the planet gear carrier member, and one for the ring gear member. The relative length between the nodes of each planetary gear-set lever may be used to represent the ring-to-sun ratio of each respective gear-set. These lever ratios, in turn, are used to vary the gear ratios of the transmission in order to achieve appropriate ratios and ratio progression. Mechanical couplings or interconnections between the nodes of the various planetary gear-sets are illustrated by thin, solid lines and torque-transmitting devices such as clutches and brakes are presented as interleaved fingers. If the subject torque-transmitting device is a brake, one set of the fingers is grounded. Further explanation of the format, purpose and use of lever diagrams may be found in SAE Paper 810102, authored by Benford, Howard and Leising, Maurice, "The Lever Analogy: A New Tool in Transmission Analysis", 1981, which is hereby fully incorporated by reference.

The transmission assembly 18 includes a first planetary gear-set 36 having a plurality of nodes, shown in FIGS. 3 and 4 as a first node A, a second node B, and a third node C. The nodes A, B, and C represent a first, second and third members of the planetary gear-set 36, such as a ring gear member, a carrier member rotatably supporting a plurality of pinion gears, and a sun gear member, although not necessarily in that order. As shown, each of the above-discussed embodiments of the first planetary gear-set 36 is operatively and continuously connected to the first transmission input member 24-1. The transmission assembly 18 also includes a second planetary gear-set 38 having a plurality of nodes shown in FIGS. 3 and 4 as a first node D, a second node E, and a third node F. As shown, each of the above-discussed embodiments of the second planetary gear-set 38 is operatively and continuously connected to the second transmission input member 24-2 and to the transmission output member 26. While the first and the second planetary gear-sets 36, 38 are shown as continuously connected to the respective first and second transmission input members 24-1, 24-2, nothing precludes each subject gear-set from being selectively connected to its respective input member, such as via a particular torque-transmitting device (not shown).

The transmission assembly 18 additionally includes a transmission housing 40 configured to encase and retain the first and second planetary gear-sets 36, 38. The transmission housing 40 may be mounted to each of and in between the first and second power sources 14, 16. As noted above, the transmission assembly 18 also includes the first torque-transmitting device 42-1. The first torque-transmitting device 42-1 is configured to selectively connect or ground one of the plurality of nodes A, B, C of the first planetary gear-set 38 to the transmission housing 40. Specifically, as shown in the embodiments of FIGS. 3 and 4, the first torque-transmitting device 42-1 may be configured to selectively connect or ground the node C to the transmission housing 40. Accordingly, in the embodiments of FIGS. 3 and 4, the first torque-transmitting device 42-1 is configured to selectively connect to the transmission housing 40 the node of the first planetary gear-set 36 that is not connected to the second planetary gear-set 38.

As noted above, the transmission assembly 18 further includes the second torque-transmitting device 42-2. The second torque-transmitting device 42-2 is configured to selectively connect one of the plurality of nodes A, B, C of the first planetary gear-set 36 not connected to the transmission housing 40 to one of the plurality of nodes D, E, F of the second planetary gear-set 38. More particularly, the second torque-transmitting device 42-2 may be configured to selectively connect the node of the first planetary gear-set 36 connected to the first power source 14, and not connected to the transmission housing 40, to the node of the second planetary gear-set 38 connected to the second power source 16. Specifically, the second torque-transmitting device 42-2 may be configured to selectively connect the node A, such as the sun gear member of the first planetary gear-set 36, to the node D, such as the sun gear member of the second planetary gear-set 38, as shown in FIGS. 3 and 4. In each of the above embodiments, the second torque-transmitting device 42-2 is configured to operate as a lock-up clutch to enable fixed gear operation in the transmission assembly 18.

One of the plurality of nodes A, B, C of the first planetary gear-set 36 is directly and continuously connected to one of the plurality of nodes D, E, F of the second planetary gear-set 38. Specifically, as shown in the embodiments of FIGS. 3 and 4, the second node B may be directly and continuously connected to the third node F. The first power source 14 is operatively connected to one of the plurality of nodes A, B, C of the first planetary gear-set 36 that is not directly and continuously connected to one of the plurality of nodes D, E, F of the second planetary gear-set 38. The powertrain 13 also includes the second input member 24-2, such that the second power source 16 is then operatively connected via the second input member to one of the plurality of nodes A, B, C, D, E, F of the first or second planetary gear-sets 36, 38. Specifically, as shown in the embodiments of FIGS. 3 and 4, the second power source 16 may be continuously connected via the second input member 24-2 to the node D.

As shown in FIGS. 3 and 4, the second power source 16 is directly and continuously connected to the second planetary gear-set 38. Specifically, the second torque-transmitting device 42-2 is configured to selectively connect the node of the first planetary gear-set 36 connected to the first power source 14 to the node of the second planetary gear-set 38 connected to the second power source 16. Specifically, in the subject embodiments, the node A is selectively connected to the node D via the second torque-transmitting device 42-2.

As noted above, the transmission assembly 18 may also include the third torque-transmitting device 42-3. The third torque-transmitting device 42-3 is configured to selectively connect to the transmission housing 40 a node of the second planetary gear-set 38 that is connected to the second power source 16. Specifically, as depicted in the exemplary embodiment of FIGS. 3 and 4, the third torque-transmitting device 42-3 may be configured to selectively connect the node D, such as the sun gear member of the second planetary gear-set 38, to the transmission housing 40. The third torque-transmitting device 42-3 may be used as an input brake to permit purely electric operation of the vehicle 10 via the first power source 14, i.e., without utilizing torque input from the second power source 16.

As also noted above, the transmission assembly 18 may additionally include the fourth torque-transmitting device 42-4. As shown in the embodiment of FIG. 4, the fourth torque-transmitting device 42-4 may be configured to selectively connect the node of the first planetary gear-set 36 that is connected to the first power source 16 to the node of the first planetary gear-set that is directly and continuously connected to the one of the plurality of nodes of the second planetary gear-set 38. Specifically, the fourth torque-transmitting device 42-4 may selectively connect the node A, such as the sun gear member of the first planetary gear-set 36, to the node F, such as the ring gear member of the second planetary gear-set 38, wherein the node F is in turn connected to the node B, such as the carrier member of the first planetary gear-set.

Figure 4A:
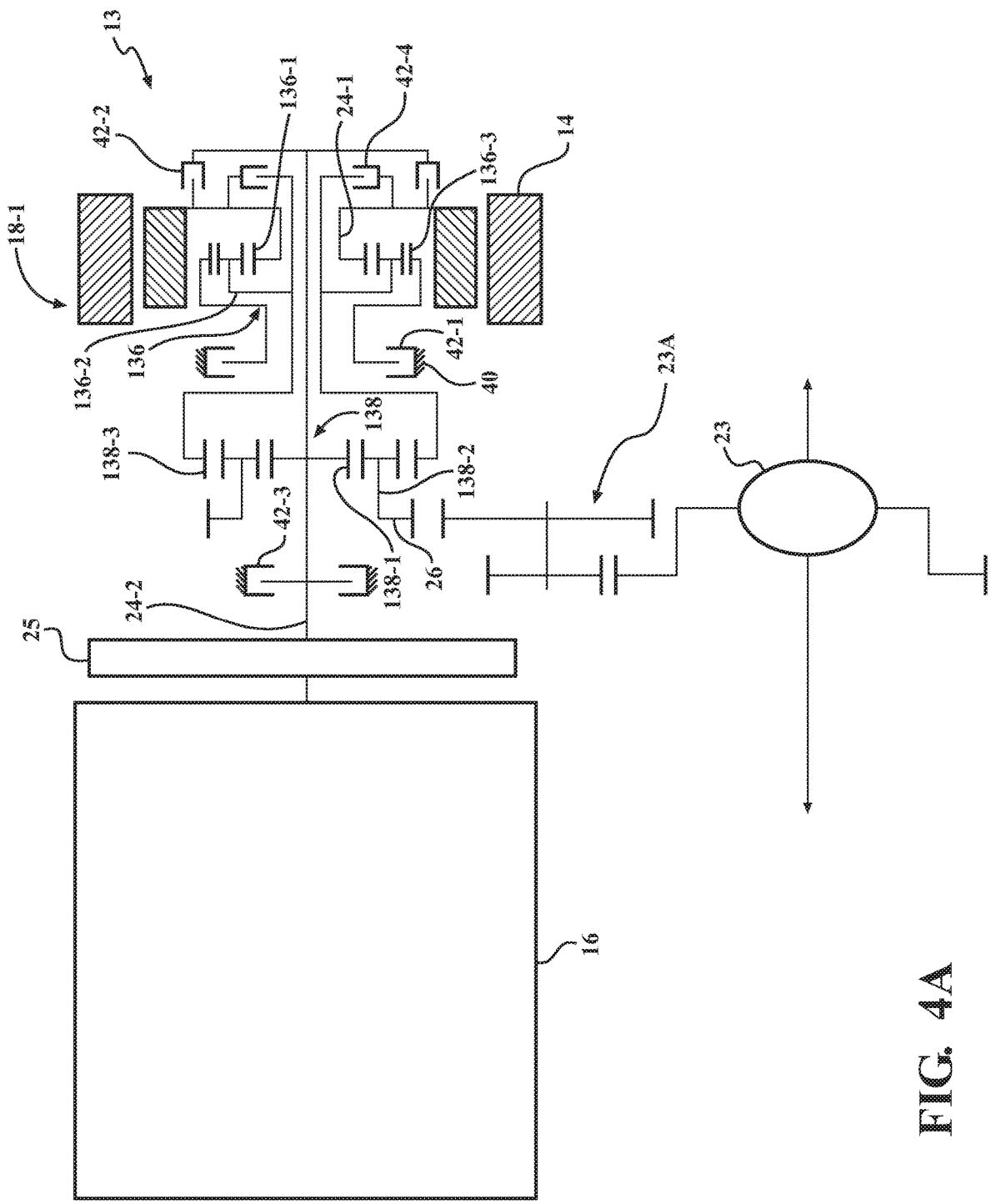
FIG. 4A is an exemplary schematic stick diagram illustration of the powertrain corresponding to the lever diagram of FIG. 4.

In FIG. 4A, the powertrain 13 is represented by a schematic stick diagram that depicts specific planetary gear-set connections corresponding to and reflected by the lever diagram of FIG. 4. The exemplary embodiment of the transmission assembly 18 represented by the lever diagram in FIG. 4 is identified in FIG. 4A with a numeral 18-1. The transmission assembly embodiment 18-1 has a specific embodiment of the first planetary gear-set 36, identified with a numeral 136, and a specific embodiment of the second planetary gear-set 38, identified with a numeral 138. The first planetary gear-set 136 employs a sun gear member 136-1 which is circumscribed by a ring gear member 136-3, and a carrier member 136-2 rotatably supporting a plurality of pinion gears that meshingly engage both the sun gear member 136-1 and the ring gear member 136-3. The second planetary gear-set 138 employs a sun gear member 138-1 which is circumscribed by a ring gear member 138-3, and a carrier member 138-2 rotatably supporting a set of pinion gears. The set of pinion gears meshingly engages the sun gear member 138-1 and the ring gear member 138-3.

The exemplary transmission assembly embodiment 18-1 is configured such that the first power source 14, which is shown as an electric motor-generator is continuously connected via the first input member 24-1 to the node A, which is specifically shown as the sun gear member 136-1. The node B, which is specifically shown as the carrier member 136-2, is continuously connected to the node F, which is specifically shown as the ring gear member 138-3. The node C, which is specifically shown as the ring gear member 136-3, is selectively connected to the transmission housing 40 via the first torque-transmitting device 42-1. The second power source 16, which is shown as an internal combustion engine, is continuously connected via the second input member 24-2 and a torsional damper 25 to the node D, which is specifically shown as the sun gear member 138-1.

The node E, which is specifically shown as the carrier member 138-2, is continuously connected to the final drive assembly 23 via the transmission output member 26 and through a torque transfer mechanism 23A, such as a transfer gear set or a chain. Although not specifically shown, the embodiment of the transmission assembly 18 represented by the lever diagram of FIG. 3 may be represented by a schematic stick diagram identical in all respects to the one depicted in FIG. 4, other than the absence of the fourth torque-transmitting device 42-4 selectively connecting the sun gear member 136-1 of the first planetary gear-set 136 to the ring gear member 138-3 of the second planetary gear-set 138.

Overall, each of the above embodiments of the powertrain 13 permits use of a single power source 14 coupled to the transmission assembly 18 employing a minimal number of gear sets and torque transmitting devices for powering the vehicle 10 at the first drive axle 12. A lock-up clutch is employed by the transmission assembly 18 to enable fixed gear operation therein. Additionally, the transmission assembly 18 may employ an input brake to permit electric propulsion of the vehicle 10 via the first power source 14, i.e., without torque input from the second power source 16. The disclosed embodiments of the transmission assembly 18 coupled with the first power source 14 and the second power source 16 provide a low-complexity, efficiently packaged powertrain for an electric or a hybrid-electric motor vehicle. Additionally, such embodiments of the powertrain 13 and the transmission 18 may be used either in front-wheel-drive or all-wheel drive vehicle configurations.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A powertrain for a motor vehicle, comprising:
   a first power source configured to generate a first torque output;
   a second power source configured to generate a second torque output; and
   a transmission assembly including:
      a first input member, a second input member, and an output member;
      a first planetary gear-set having a plurality of nodes and operatively connected to the first input member;
      a second planetary gear-set having a plurality of nodes operatively connected to second input member and to the output member;
      a transmission housing configured to retain the first and second planetary gear-sets;
      a first torque-transmitting device configured to selectively connect one of the plurality of nodes of the first planetary gear-set to the transmission housing; and
      a second torque-transmitting device configured to selectively connect one of the plurality of nodes of the first planetary gear-set not connected to the transmission housing to one of the plurality of nodes of the second planetary gear-set;
   wherein:
      one of the plurality of nodes of the first planetary gear-set is directly and continuously connected to one of the plurality of nodes of the second planetary gear-set;
      the first power source is operatively connected via the first input member to one of the plurality of nodes of the first planetary gear-set;
      the second power source is operatively connected via the second input member to one of the plurality of nodes of the second planetary gear-set; and
      the second torque-transmitting device is configured to selectively connect the node of the first planetary gear-set connected to the first power source to the node of the second planetary gear-set connected to the second power source.

2. The powertrain according to claim 1, wherein the node of the first planetary gear-set connected to the first power source is a sun gear member of the first planetary gear-set and the node of the second planetary gear-set connected to the second power source is a sun gear member of the second planetary gear-set.

3. The powertrain according to claim 1, wherein the first torque-transmitting device is configured to selectively connect to the transmission housing a node of the first planetary gear-set not connected to the second planetary gear-set.

4. The powertrain according to claim 3, wherein the node of the first planetary gear-set not connected to the second planetary gear-set is a ring gear member of the first planetary gear-set.

5. The powertrain according to claim 3, wherein the transmission assembly additionally includes a third torque-transmitting device configured to selectively connect to the transmission housing the node of the second planetary gear-set connected to the second power source.

6. The powertrain according to claim 5, wherein the transmission assembly additionally includes a fourth torque-transmitting device configured to selectively connect the node of the first planetary gear-set connected to the first power source to the node of the first planetary gear-set directly and continuously connected to the one of the plurality of nodes of the second planetary gear-set.

7. The powertrain according to claim 6, wherein the node of the first planetary gear-set directly and continuously connected to the one of the plurality of nodes of the second planetary gear-set is a carrier member of the first planetary gear-set.

8. The powertrain according to claim 1, wherein the vehicle includes a final drive assembly operatively connected to the second planetary gear-set at a node not directly and continuously connected to the first planetary gear-set.

9. The powertrain according to claim 8, wherein the motor vehicle is arranged along a longitudinal vehicle axis and wherein each of the first power source, second power source, and the final drive assembly is arranged along the longitudinal vehicle axis or along respective axes arranged transverse to the longitudinal vehicle axis.

10. A motor vehicle comprising:
a first road wheel and a second road wheel;
a final drive assembly operatively connected to each of the first and second road wheels; and
a powertrain including:
a first power source configured to generate a first torque output;
a second power source configured to generate a second torque output; and
a transmission assembly including:
  a first input member and a transmission output member operatively connected to the final drive assembly;
  a first planetary gear-set having a plurality of nodes and operatively connected to the first input member;
  a second planetary gear-set having a plurality of nodes operatively connected to second input member and to the output member;
  a transmission housing configured to retain the first and second planetary gear-sets;
  a first torque-transmitting device configured to selectively connect one of the plurality of nodes of the first planetary gear-set to the transmission housing; and
  a second torque-transmitting device configured to selectively connect one of the plurality of nodes of the first planetary gear-set not connected to the transmission housing to one of the plurality of nodes of the second planetary gear-set;
  wherein:
    one of the plurality of nodes of the first planetary gear-set is directly and continuously connected to one of the plurality of nodes of the second planetary gear-set;
    the first power source is operatively connected via the first input member to one of the plurality of nodes of the first planetary gear-set;
    the second power source is operatively connected via the second input member to one of the plurality of nodes of the second planetary gear-set; and
    the second torque-transmitting device is configured to selectively connect the node of the first planetary gear-set connected to the first power source to the node of the second planetary gear-set connected to the second power source.

11. The motor vehicle according to claim 10, wherein the node of the first planetary gear-set connected to the first power source is a sun gear member of the first planetary gear-set and the node of the second planetary gear-set connected to the second power source is a sun gear member of the second planetary gear-set.

12. The motor vehicle according to claim 11, wherein the node of the first planetary gear-set not connected to the second planetary gear-set is a ring gear member of the first planetary gear-set.

13. The motor vehicle according to claim 12, wherein the transmission assembly additionally includes a fourth torque-transmitting device configured to selectively connect the node of the first planetary gear-set connected to the first power source to the node of the first planetary gear-set directly and continuously connected to the one of the plurality of nodes of the second planetary gear-set.

14. The motor vehicle according to claim 13, wherein the node of the first planetary gear-set directly and continuously connected to the one of the plurality of nodes of the second planetary gear-set is a carrier member of the first planetary gear-set.

15. The motor vehicle according to claim 10, wherein the first torque-transmitting device is configured to selectively connect to the transmission housing a node of the first planetary gear-set not connected to the second planetary gear-set.

16. The motor vehicle according to claim 15, wherein the transmission assembly additionally includes a third torque-transmitting device configured to selectively connect to the transmission housing the node of the second planetary gear-set connected to the second power source.

17. The motor vehicle according to claim 10, wherein the vehicle includes a final drive assembly operatively connected to the second planetary gear-set at a node not directly and continuously connected to the first planetary gear-set.

18. The motor vehicle according to claim 17, wherein the motor vehicle is arranged along a longitudinal vehicle axis, and wherein each of the first power source, second power source, and the final drive assembly is arranged along the longitudinal vehicle axis or along respective axes arranged transverse to the longitudinal vehicle axis.

* * * * *